(No Model.)

5 Sheets—Sheet 1.

N. W. HOLT.
PURIFIER AND DUST COLLECTOR.

No. 513,788. Patented Jan. 30, 1894.

WITNESSES

INVENTOR
Noah W. Holt
by Parker & Burton
Attorneys.

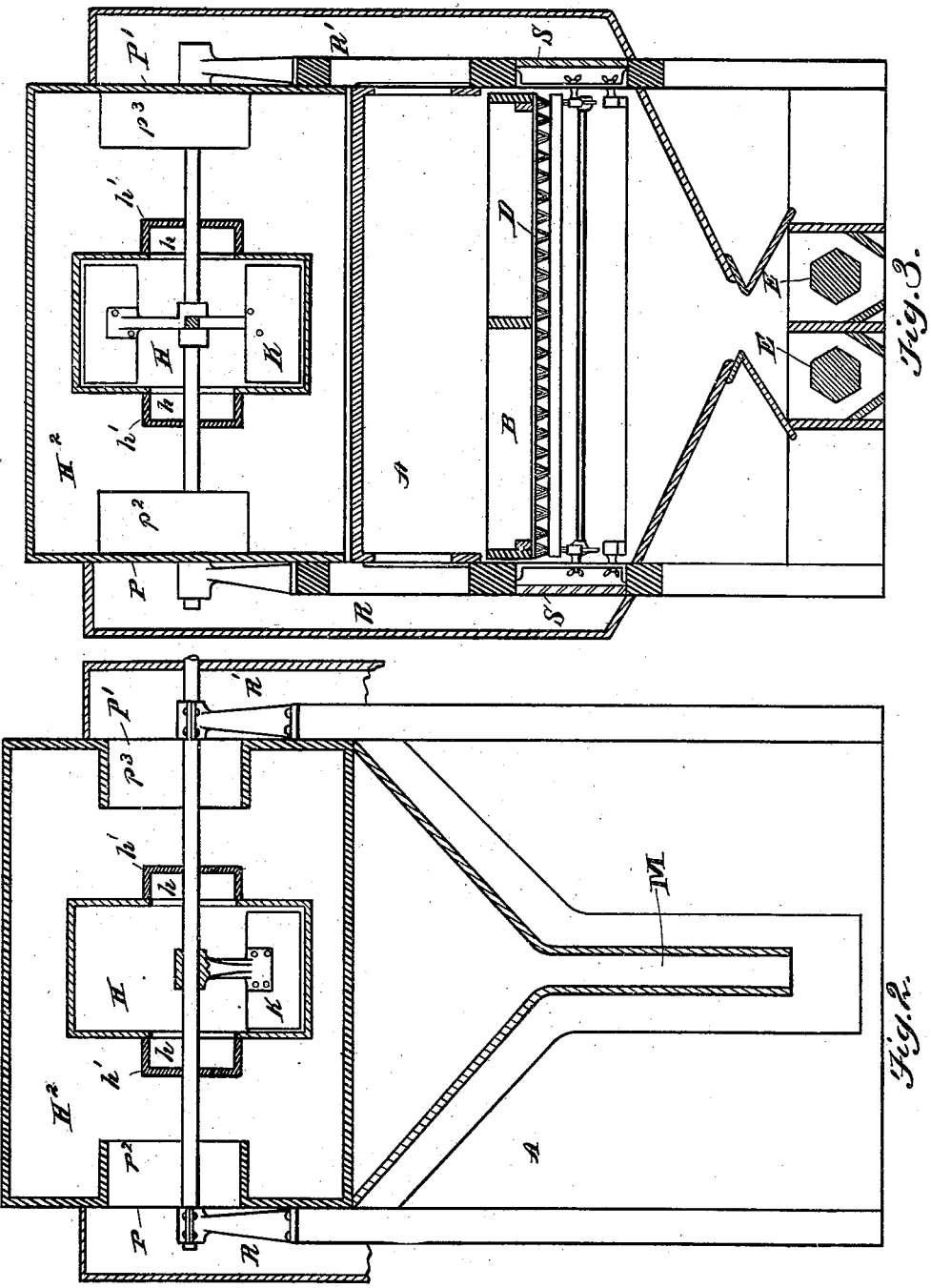

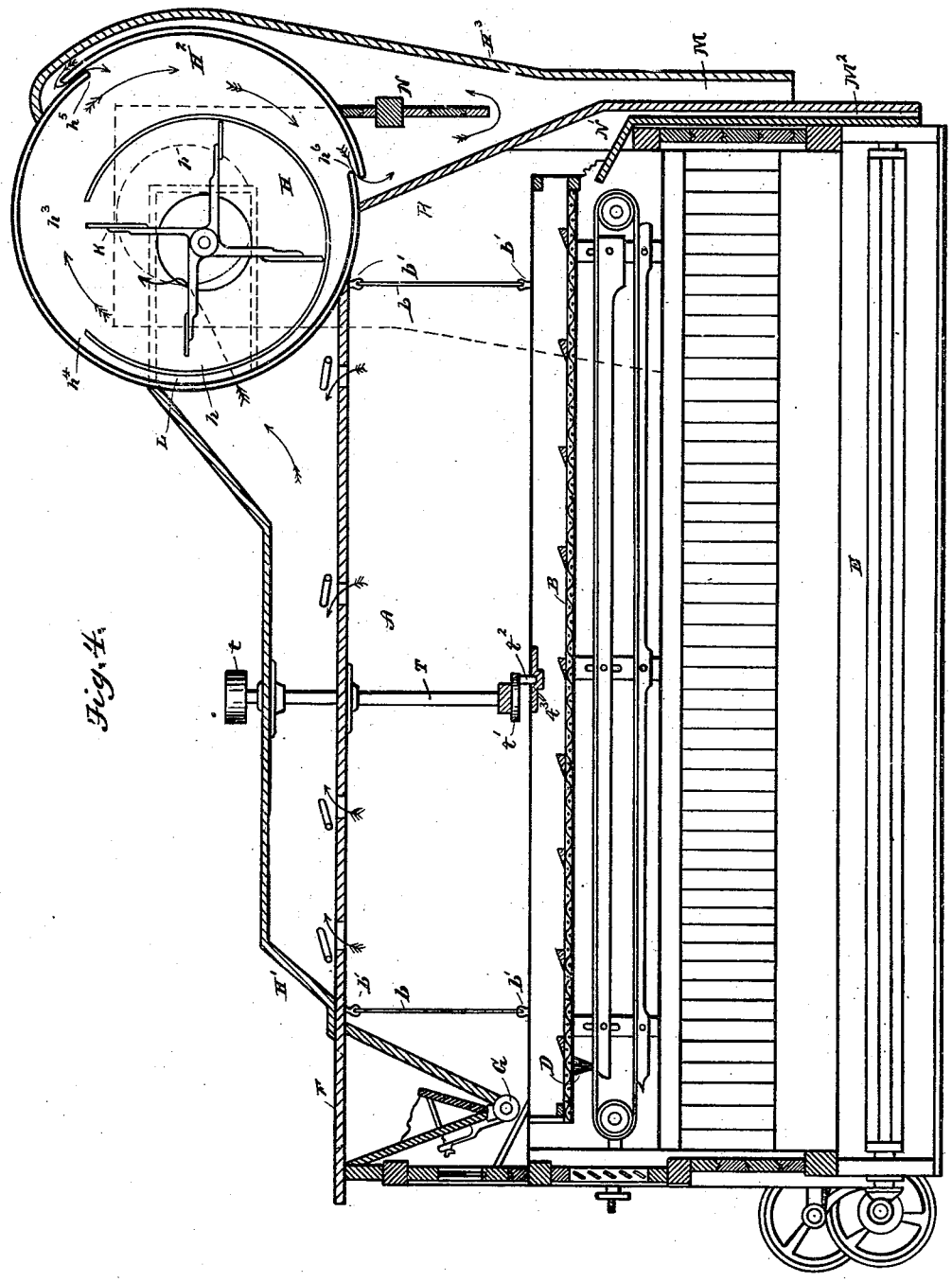

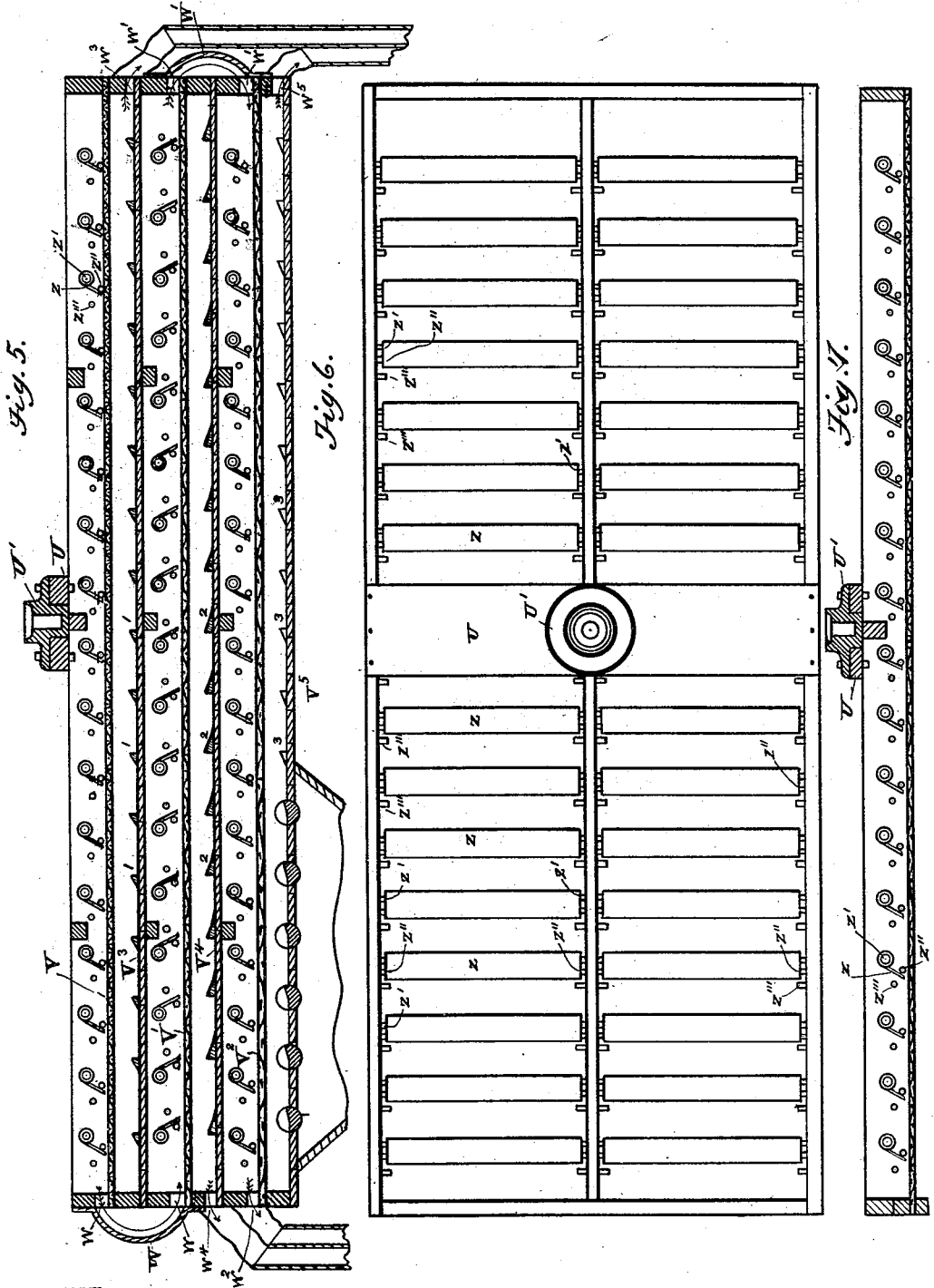

(No Model.)　　　　　　　　　　　　　　　　5 Sheets—Sheet 5.
N. W. HOLT.
PURIFIER AND DUST COLLECTOR.

No. 513,788.　　　　　　　　　　　Patented Jan. 30, 1894.

WITNESSES　　　　　　　　　　　　　INVENTOR

UNITED STATES PATENT OFFICE.

NOAH W. HOLT, OF MANCHESTER, MICHIGAN.

PURIFIER AND DUST-COLLECTOR.

SPECIFICATION forming part of Letters Patent No. 513,788, dated January 30, 1894.

Application filed May 19, 1893. Serial No. 474,750. (No model.)

*To all whom it may concern:*

Be it known that I, NOAH W. HOLT, a citizen of the United States, residing at Manchester, county of Washtenaw, State of Michigan, have invented a certain new and useful Improvement in Purifiers and Dust-Collectors; and I declare the following to be a full, clear, and exact description of the invention, such as will enable others skilled in the art to which it pertains to make and use the same, reference being had to the accompanying drawings, which form a part of this specification.

My invention relates to purifiers and dust collectors in flour mills employing a closed air current, and consists in the combination and arrangement of parts hereinafter described and claimed.

Figure 1:
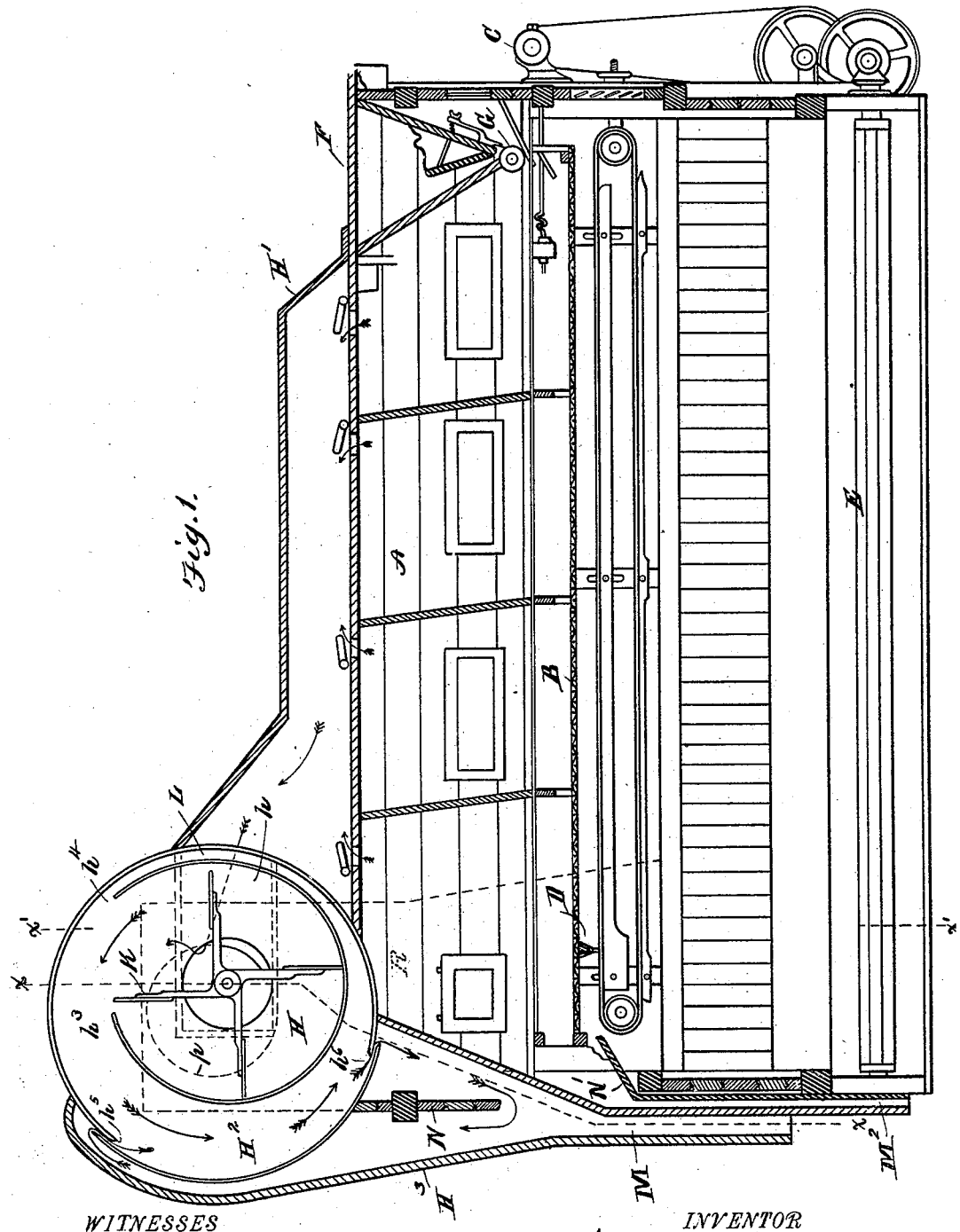
Figure 8:
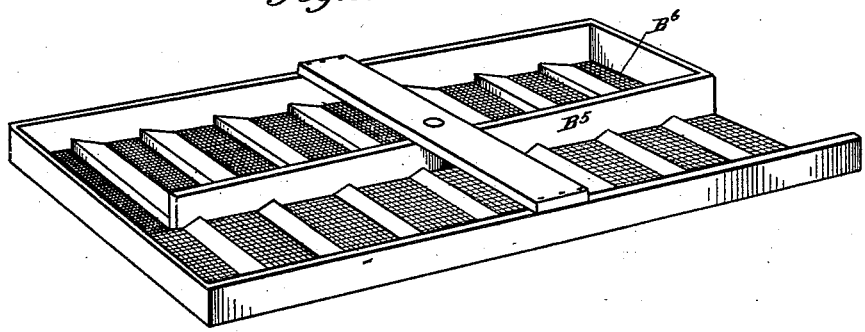
Figure 9:
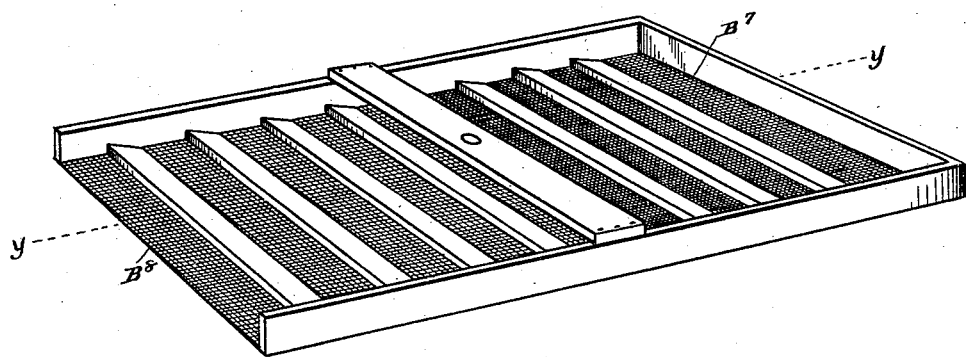
Figure 10:
Figure 11:

In the drawings, Figure 1 is a vertical central longitudinal section of my improved purifier and dust collector. Fig. 2 is a vertical cross section of Fig. 1 on the line $x$—$x$, while Fig. 3 is a vertical cross section of Fig. 1 on the line $x'$—$x'$. Fig. 4 is a vertical central longitudinal section of my improved purifier, containing a modified arrangement for operating the shaker. Fig. 5 illustrates a compound shaker, or series of screens, by a vertical section, to be operated upon the principle illustrated in Fig. 4. Fig. 6 is a plan view of the upper shaker illustrated in Fig. 5, and of which Fig. 7 is an independent sectional view. Fig. 8 is a perspective view of a shaker which may be constructed to operate upon the principle of that shown in Fig. 4. Fig. 9 illustrates a shaker also operating upon the same principle, but of a modified form. Fig. 10 is a sectional view on line $y$—$y$ of Fig. 9. Fig. 11 is a section of a sieve containing a modified form of slats.

In the drawings, A represents the casing of the machine, which is common to all of the forms, and which, except as hereinafter stated, is of the usual form of the so called "George T. Smith Middlings Purifier." Located therein, as shown in Fig. 1, is a shaking bolt B, and in the form illustrated in Fig. 1 it is operated by an eccentric C and swept on its under side by a traveling brush D. The shaker and traveling brush in this form are of the well-known George T. Smith type, as shown in Letters Patent No. 258,142, dated May 16, 1882,—and, together with their driving mechanism, have nothing in them new or novel, and hence do not require any detailed description.

Common to all the forms, an inlet opening F is provided, containing therein a feed roller G. This feed mechanism is common and well-known, and hence does not need detailed description.

At the end opposite the feed roll is mounted in a housing H a rotary fan, K, which is driven by appropriate means in the direction of the arrows, the means for driving being such as are usually used for that purpose. The fan K is much shorter than the width of the casing of the machine, being equal to only about one-fourth of the whole width. The housing H has air inlet openings, $h$, $h$, on either side, leading into the eye of the fan; these inlet openings are covered by air tight wind trunks, $h'$, $h'$, which extend back of the housing H coalescing at that point, and thence extend along nearly the whole length of the upper portion of the casing A, terminating at the feed chute at H', thus forming over the top of the casing a single wind trunk, into which the top of casing A opens, with bifurcations leading to either side of the housing H to the eye of the fan.

It is obvious that the rotation of the fan is adapted to draw the air from the casing above the bolting cloth into the fan. Surrounding and inclosing the housing H of the fan, is another housing or casing $H^2$, and which extends the full width of the casing A. The housing $H^2$ is shown to be curved in form, and to be eccentrically situated with reference to the housing H, as shown in Fig. 1, and closely approaching thereto on its rear side. This produces a curved narrow passage between the two, marked L. As the housing H is cut away at the top at the point $h^3$, and is open to the space inclosed by the housing $H^2$ from the point $h^3$ to $h^4$, the air taken in by the fan is blown out at the opening $h^3 h^4$ into the casing $H^2$, taking the direction of the arrows. The casing $H^2$ has two openings, $h^5$, $h^6$, formed by the walls overlapping but not coming in contact, that at $h^5$ being formed by the overlapping of the outer wall in the reverse direction from the internal current, while that at $h^6$ is formed by the overlapping in the direction of the current. The forms of these openings thus determine the direction of the air currents through them, that at $h^5$ drawing in the air from an outer chamber yet to be described, while at $h^6$ the air is forced outwardly, as shown by the direction of the arrows.

Upon the exterior of the casings A and $H^2$ is formed another casing, $H^3$, which is closed in air tight at its top in contact with casing $H^2$, and covers the opening $h^5$; from thence it depends downward and forms an air chamber triangular in shape with the apex downward, terminating in a spout M, as shown in Figs. 1 and 2. A little back of the opening $h^6$, attached to casing $H^2$, depends a partition N, dividing the upper portion of spout M into two divisions. Below the bolt B, and in front of the machine, extends another angularly depending partition, N', from just under the tail of the sieve outward to a tail spout $M^2$, formed within the arm of the case A. At either side of the casing $H^2$, there are openings centrally located and of less diameter than the walls of the casing; these are shown in Fig. 2 at P, P', and are indicated by the circular dotted line $p$ in Fig. 1. Surrounding these openings are inwardly projecting hoods, $p^2$, $p^3$, raised from the plane of the end of the casing $H^2$ to check the currents of air flowing outwardly through the openings P, P', as shown by the arrows. Covering the openings P P', are air tight wind trunks R R', which extend downward as shown in Fig. 3, and by dotted lines in Fig. 1, until they communicate with the air space in the body of the casing A under the bolting cloth, through slatted openings, as shown in section in Fig. 3, at S S.

In the modified form, as shown in Fig. 4, the shaking bolt B is carried in a frame of the usual construction, except that it is of a somewhat narrower width for the same width of casing as that illustrated in Fig. 1. This frame is hung upon hangers $b\ b$, longer than those usually employed, which are connected upon top and bottom by eye bolts $b'\ b'$, and which practically afford motion in all directions. This permits the bolt to have a gyrating motion. Instead of the eccentric C, as shown in Fig. 1, being used to give the bolt motion, I dispense with the eccentric and the shaft operating it, and also with the spring commonly in use for the purpose of resisting motion and compelling the return of the bolt up to the cam; and use instead, properly journaled through the center of the top of the machine, a perpendicular shaft T, which may be driven by any appropriate belt from a countershaft through the means of the pulley $t$. The lower end of this shaft carries a crank wheel $t'$, upon which is a wrist pin $t^2$. In practice, this shaft is so arranged as to be substantially above the center of the bolt. At this point, a strong girt is inserted, passing from side to side of the framework of the bolt, and which forms a support and carries a bearing $t^3$. This bearing is perforated, and the wrist pin $t^2$ engages in the perforation. It is obvious that, upon giving motion to the shaft T, the crank thus formed by the wrist pin and crank wheel being in engagement with the cross shaft as described, will give to the sieve or bolt carried in the frame a gyrating motion. The effects of this motion upon the sieve carrying bolting material is to bring the lighter and coarser portions of material to the surface, and to carry down the finer and heavier portions in a much greater degree than that of the ordinary shaking sieve. A sieve, therefore, of the form described and operating as shown in Fig. 4, in which air currents are drawn up through it, assisting this mode of operation, is much more efficient, and will bolt more material in the same length of time for the same size, than the one shown in Fig. 1, or as commonly used in the ordinary middlings purifier.

In this device, there is no special necessity of causing the material to travel, except such particles as will not pass through the sieve, and such particles find their way over the tail thereof at N' and through the spout $M^2$, the only difference between the machines illustrated by Figs. 1 and 4 being in the construction and manner of operating the bolt or sieve. If desired, however, to cause the material to travel, it can be done by adding to the sieve in question the device illustrated and used for that purpose in Figs. 5, 6, 7, 8, 9, 10 and 11, and which is hereinafter described.

In Fig. 5, there is illustrated a compound bolt, and which may be used in place of the bolt B in the machine illustrated by Fig. 4, it being driven by a perpendicular shaft through the center of the upper portion of the case, and having appropriate bearings in exactly the manner illustrated by such figure. The frame-work of this bolt illustrated by Fig. 5 has much greater perpendicular depth than that illustrated in Fig. 4. In substantially its center in the upper portion is a cross girt U, which carries in its center an appropriate bearing U' for a wrist pin. Located within this frame-work is a series of three sieves, extending from end to end and from side to side. The upper one is marked V; the center one, V'; and the bottom one, $V^2$. The upper one is finer than the next or middle one, and the lower one is coarser than the middle one. At the tail of the upper bolt B there is arranged a longitudinal opening or slit in the end cross bar of the frame. Another longitudinal slit in the same cross bar constitutes an opening contiguous to the head of the middle sieve V'. These openings are marked $w, w$. They communicate with each other by means of the cap W, semi-circular in form, as shown in section in Fig. 5, and illustrated by the direction of the arrow. The cap has heads inclosing the interior space, substantially air tight. Material, therefore, passing from the tail of the upper sieve V, passes in the direction of the arrow, and enters at the head, and travels in the opposite direction upon the sieve V'; at the tail of the sieve V' is a similar longitudinal opening, in the cross bar of the frame at the opposite end of the shaker, and this communicates by means of a similar cap W' with a similar opening at the head of the lower sieve V²; these openings are marked $w'$, $w'$. The material, therefore, passing over the tail of the sieve V', passes through the openings, and is deposited at the head of the sieve V². At the opposite end of the frame, another slit is cut in the cross bar, marked $w^2$, and the matter not bolted through sieve V² passes out through this opening into an appropriate spout. Beneath the upper sieve V is located a longitudinal imperforate partition V³, and beneath the central sieve is located a similar longitudinal imperforate partition V⁴; while the whole bolting frame is closed at the bottom, with certain exceptions hereinafter named, by an imperforate bottom V⁵. It is obvious from the construction as illustrated, that the material passing through the upper sieve V must fall upon the partition V³; and, for the reasons hereinafter described, it will be forced along and compelled to pass out through a longitudinal opening or slit at $w^3$, and from thence to any appropriate conveyer. In a similar manner, the material which passes through the sieve V' falls upon the partition V⁴, and passes out through a similar longitudinal slit at $w^4$ at the opposite end of the bolting frame. The material which passes through the lower and coarser sieve V² falls upon the bottom of the bolting frame V⁵, and, with the exception hereinafter named, passes out through the slit $w^5$ at the bottom at the end of the sieve.

Located in the bottom of the bolting frame are cut offs arranged to operate so as to permit portions of the material, as it travels along the bottom V⁵, to drop through and to be received in spouts or conveyers, instead of traveling to the end thereof. These cut offs consist of substantially semi-cylindrical pieces fitting into appropriate sockets in the bottom and extending transversely from side to side, and pivoted in the side walls of the frame and operated from the outside of the side wall by any appropriate means which may be applied to turn them. As illustrated in Fig. 5, the substantially flat side of these cut offs are arranged uppermost. Instead, however, of being entirely flat, and thus forming a level surface corresponding with that of the plane of the bottom, one side is raised so that they are somewhat more than semicylindical in cross section; and, while in the position shown by the figure, the raised side operates as ledges or triangular prismatic slats raised from the plane of the bottom in a similar manner to those hereinafter described, which are fixed upon the bottom and also operate in a similar manner and for the same purpose. It is obvious from the described construction that these cutoffs can be adjusted in different ways so as to raise either side and depress the other, thus forming reversible baffle strips and thus compel the stock to travel in opposite directions whenever desired, as well as to make the opening when used as valves, face either way and thus cut off the travel of and discharge the stock when flowing in either direction. It will be noticed that in each of the imporforate partitions V³, V⁴ and V⁵, there are indicated triangular slats, 1, 1, 1, 2, 2, 2, 3, 3, 3, extending across each of the partitions. These slats are so arranged that their vertical sides are toward the openings $w$ $w$ $w$ in the ends through which the material from the partitions is heretofore described as passing; whereas, the sloping sides are in the opposite direction. The effect of these slats is that, by the gyrating motion of the frames carrying the partitions, the material is thrown up and over the sloping sides of the slats and down the perpendicular side. The result therefore is that it is continually being carried in the direction of the sloping sides, and by the action of the perpendicular sides. It constantly travels, therefore, from the head of the partitions toward the opening at the tail of the partition whence it is carried out. In Figs. 5, 6, and 7, I have illustrated another means whereby the same effect is produced, and which may be adopted, if desired, in the place of the triangular slats; or the triangular slats may be adopted on the sieves in the place of the means hereinafter described, although I prefer for the action upon the sieves the latter form. This method consists in employing sloping cant boards, extending transversely from side to side of the bolting frame, and if the bolt is a double bolt, as shown in Fig. 6, extending from the longitudinal partition in its center to either side. These are marked Z Z Z Z. In the frame-work, at a distance above the sieve, and little less than the width of the cant board, is located, corresponding with the position of the cant board, a series of pins Z' Z'. Upon these pins are pivoted the upper edges of the cant boards by wire staples; or, if the same are made of metal, as they may be, by turning the upper edge of the cant board over and around the pin, as illustrated in the sectional Figs. 5 and 7, the cant boards are permitted to turn freely upon these pins. The exact form of this construction is not material, as the pins might be made rigid with the cant boards, extending through holes in the side frame of the bolting frame.

Just above the sieve is located a series of stop pins which extend through the side frames of the bolting frame, and are marked Z² Z². While in their normal position, the cant boards drop down and rest upon these stop pins, as shown in sectional Figs. 5 and 7. Located above the pins Z² Z² are similar stop pins Z³ Z³, which prevent the cant boards from flying upward too far or from turning over in their operation. Upon gyrating motion being given to the bolting frame carrying the sieves and this apparatus, the sieves receiving material as hereinbefore described, the material passes under the cant boards in the direction of their slope, on the reverse motion of the sieve; but, on the motion of the sieve being reversed so as to be in the direction of the slope of the cant boards, the cant boards close down upon the material and against the stop pins, preventing the return of the material and forcing it along until ultimately the residue is forced out through the openings $w$, $w'$, &c. If desired, this system could be used in the place of the triangular cant boards hereinbefore described, as they are interchangeable in the sense that they are equivalents in the mode of operation in forcing the material from one end of the sieve to the other.

Figs. 8, 9, 10 and 11 illustrate in perspective a bolting sieve employing triangular slats operating substantially thereon as hereinbefore described, the sieves themselves having certain modifications; Fig. 11 being a modification of the fixed slat principle. In Fig. 8, the sieve is divided into two longitudinal sections by a central partition extending nearly its entire length. This is marked $B^5$, the cross bar and bearing being attached to the central partition, and holding it firmly in place. The meshes of the sieve are divided into two or more sections, that at the head being the finest, and that at the tail being the coarsest. The head of the sieve, or the beginning of the travel of the material, is at $B^6$, the closed end of the sections. The arrangement of the triangular slats is such that, on motion being given to the sieve, it passes to the opposite end and from thence in the reverse direction in the line of the arrow; it returns to the head of the sieve upon the other section, which thus in effect becomes the tail, and from thence passes off into any convenient receptacle. In Fig. 9 there is a bolting sieve of a simpler construction, in which the triangular slats are employed to transmit the material from the head of the sieve at $B^7$ to the tail of $B^8$. Fig. 10 may be considered a sectional view practically of either Fig. 8 or 9, showing the arrangement of the sieve and slats.

As hereinbefore stated, Fig. 11 is a modification in which, instead of employing triangular slats in contact with the bolting surface of the sieve, there may be employed rectangular slats in an inclined position, their lower edges projecting, but not touching, the bolting cloth, and being cut at an angle to correspond with the plane of the bolting surface so as to permit a thin sheet of material to pass under the slats upon the bolting surface, the coarser material being carried over the slats by the motion, but prevented from returning upon contrary motion, in consequence of the angular position.

The mode of operation of my device in general is as follows: The operating parts of the machine being set in motion as hereinbefore stated, and chop or middlings being fed into the head of the bolting sieve, it is subjected to air currents of varying strength, as in the ordinary Smith purifier, until the residue passes over and out of the tail spout $M^2$. As the fan is in motion, it draws the air through the bifurcated wind trunk $h'$ $h'$ from above and through the bolting cloth, and forces it out of the fan case in the direction of the arrows into the chamber between the fan case and the casing $H^2$. Here the air expands and moves relatively very slowly with a circular movement carrying the dust toward the outer currents; the lip or edge of the opening $h^6$ skims this current and takes the dust laden portion downward into the upper triangular portion of the spout M. A substantially equivalent portion of air is drawn back into the chamber at the opening $h^5$, which thus permits the dust to fall solely by its own gravity, it not being carried out of the machine by any air currents whatever. The purified air from the center of the circular currents is partially forced and partially drawn back into the body of the purifier under the bolting cloth and from thence upward through it, repeating the circuit. The hoods over the openings assist in removing only that portion of the air from the dust chamber between the casings H and $H^2$, which is the freest from dust.

The modified operation of the various bolting forms is apparent from the foregoing description, and need not be enlarged upon.

What I claim is—

1. In a combined separator and dust collector, the combination of a substantially airtight casing containing feed and discharge openings, a fan and fan-case inclosed therein, a wind-trunk leading from above the sieve to the eye of the fan, a dust collecting chamber surrounding the fan and fan-case, a peripheral opening in the fan case leading into said dust collecting chamber, and a wind trunk leading from openings in the axial center of said dust collecting chamber to and opening into a space below the grading sieve, said openings from the dust collecting chamber being surrounded by inwardly projecting hoods, substantially as described.

2. In a combined separator and dust collector, the combination of a substantially airtight casing containing feed and discharge openings, a fan and fan case inclosed therein; a wind trunk leading from above the sieve to the eye of the fan, a dust collecting chamber surrounding the fan and fan-case, with a peripheral opening in the fan case leading into said dust collecting chamber; a wind trunk leading from openings in the axial center of said dust collecting chamber to and opening into the space below the grading sieve; and a supplemental dust collecting chamber connecting with the first named dust collecting chamber by peripheral openings in the walls thereof, one of which opens in the direction of the air current, and the other of which opens opposite to the direction of the air current created therein, whereby the outer dust laden layer of the air vortex created in the first named dust collecting chamber is skimmed off and caused to enter the second dust collecting chamber, carrying with it its burden of dust and there depositing it, the air being withdrawn and caused to re-enter the first named dust collecting chamber, substantially as described.

3. In an apparatus adapted to compel comminuted material located thereon, to move from one point to another, the combination of a movable surface upon which such material is placed, with reversible semirotative baffle strips, whereby the direction of the travel of the material can be reversed at will, substantially as described.

4. In an apparatus adapted to compel powdered material located thereon to move from one point to another, the combination of a movable surface upon which such material is placed, said surface having located therein slit like openings, rotative valve like slats located in said openings and turning upon central axes in such a manner that the edges thereof may be brought above the level of the surface in which they are located, and also adapted to alternately partly open and close said openings in the movable surface and permit the passage through said openings of the material on said surface, substantially as described and for the purpose set forth.

5. In a separating machine, in combination with a bolting surface therein, pivoted slats located transversely to the line of travel of the material thereon, and wider than the perpendicular distance between their axes and the plane of the bolting surface, and adapted to resist the flow of material in one direction, and to rise at their lower edges and permit its travel in the other direction, and means limiting the swing of the slats, substantially as described.

In testimony whereof I sign this specification in the presence of two witnesses.

NOAH W. HOLT.

Witnesses:
R. A. PARKER,
MARION A. REEVE.